June 23, 1931.  B. FURGANG  1,811,750
FUR TREATING DEVICE
Filed July 20, 1929   2 Sheets-Sheet 1
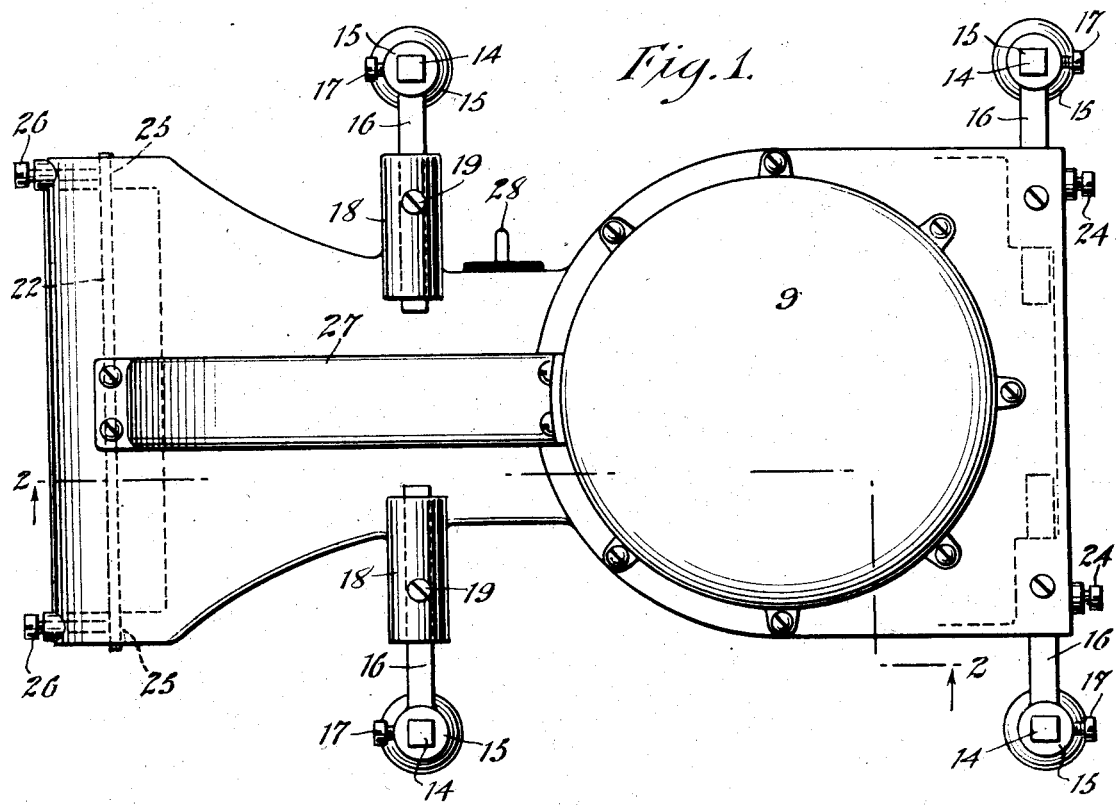
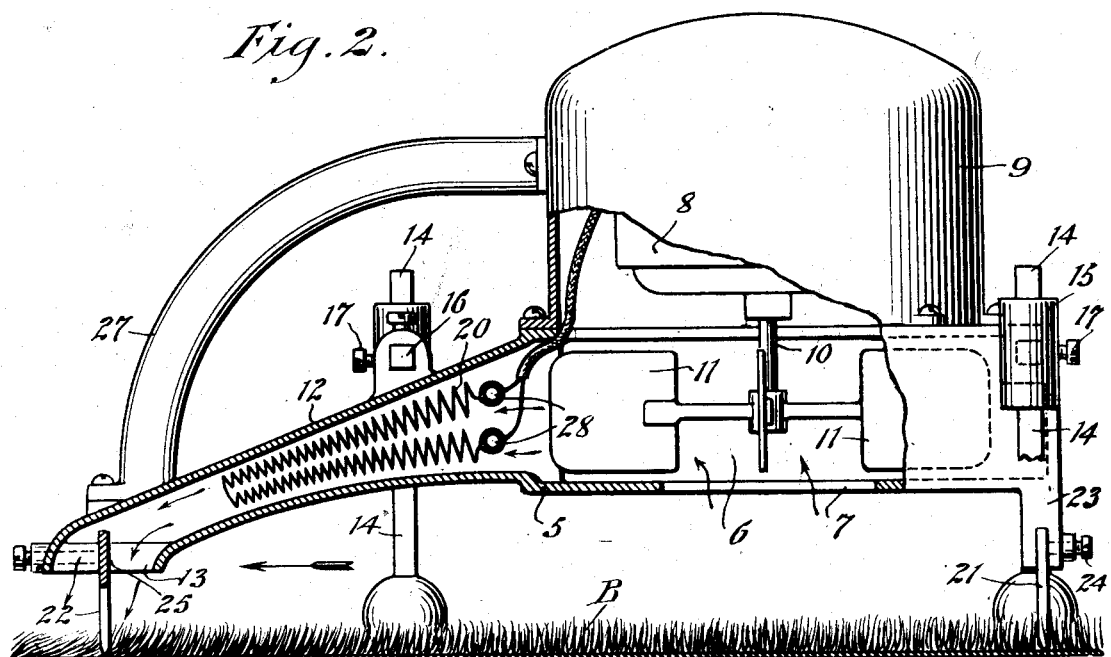

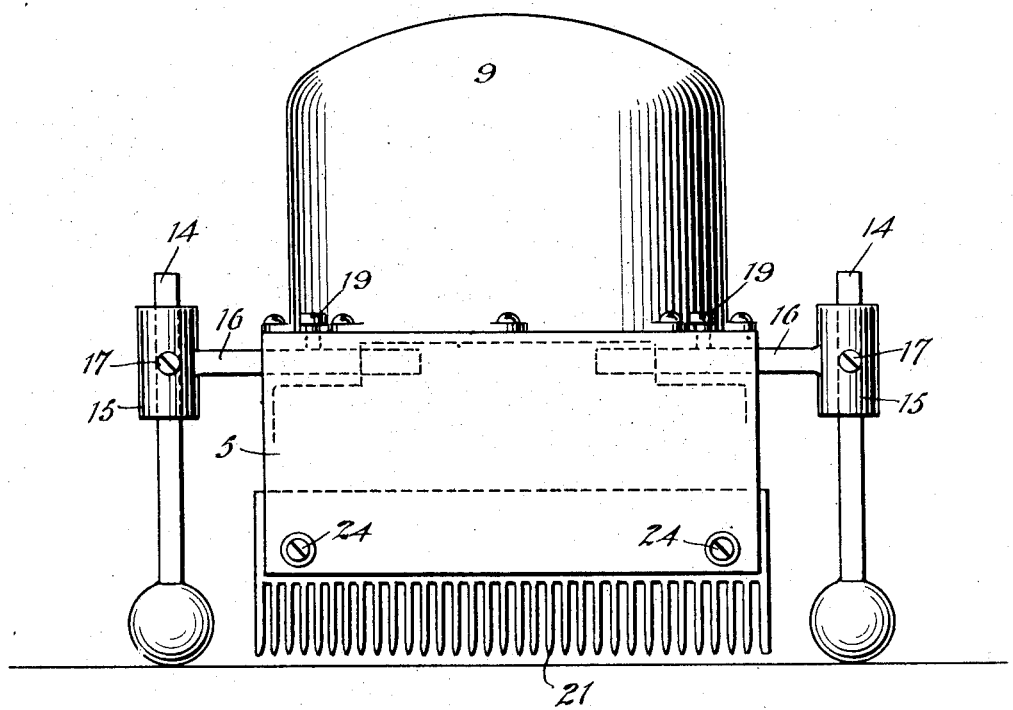

Patented June 23, 1931

1,811,750

UNITED STATES PATENT OFFICE

BENJAMIN FURGANG, OF BROOKLYN, NEW YORK

FUR TREATING DEVICE

Application filed July 20, 1929. Serial No. 379,803.

This invention relates to apparatus for the treatment of furs, and has particular reference to a device for glazing, cleaning, combing and drying the fur of pelts.

Devices or apparatus which have been previously employed for this purpose have been found deficient and objectionable, primarily on account of their tendency to singe or otherwise injure the fur, due to direct contact of a heated element with the hair, even when in the hands of an expert or experienced workman. It has also been observed that hitherto, the combing, cleaning and glazing of the pelts have required separate operations, necessarily entailing considerable time and labor and materially adding to the ultimate cost.

The present invention aims to overcome the above objections and disadvantages by first precluding any possibility of singeing or injuring the hair, due to the elimination of the direct contact of the heated element with the hair and, second, by incorporating in a single device means for accomplishing the combing, cleaning, glazing and drying operations simultaneously and effectually without the aid of experienced workmen.

The invention furthermore comprehends a machine for treating pelts or furs which is adjustable to compensate for variation in the width of the fur and the length of the hair of the pelt being treated.

Other objects reside in the simplicity of construction and mode of use of a device of this character, the economy with which the same may be produced and operated and the general efficiency derived therefrom.

With the above recited and other objects in view, reference is had to the following description and accompanying drawings, in which there is exhibited one example or embodiment of the invention, while the claims define the actual scope of the same.

In the drawings:

Figure 1 is a plan view of a pelt or fur treating device constructed in accordance with the invention.

Figure 2 is a side view thereof with parts broken away and shown in section to disclose the underlying structure and illustrating the manner in which the same is used.

Figure 3 is an end view of the device.

Referring to the drawings by characters of reference, the device includes a main body or casing 5 which defines a draft chamber 6 having an air inlet 7 on its under side. A motor 8 is arranged in a housing 9 arranged over the draft chamber with the motor shaft 10 extending into the draft chamber and having attached thereto the impeller blades 11 which operate to draw air into the draft chamber and expel the same through a forwardly projecting nozzle 12 which communicates with the draft chamber and which has a downwardly directed outlet end 13. The body or casing 5 is supported by legs 14 which are vertically adjustable through the bearing terminals 15 of the horizontally disposed laterally projecting arms 16 and secured in adjusted position by set screws 17. The arms 16 are in turn carried by and adjustable through horizontally disposed bearings 18 which are caried by the main body or casing. The arms are maintained in adjusted position by set screws 19 which extend through the bearings and frictionally contact with the arms. Under this construction and arrangement, it is obvious that the legs 14 may be laterally adjusted to compensate for variations in the width of the pelt or fur which is being treated. Suitable means is provided for heating the air which is expelled from the draft chamber 6 through the outlet 13 of the nozzle 12 and, as illustrated, this means consists of an electric resistance heating element 20 which is disposed within the nozzle. In order to provide means for combing the hair of the pelt, combs 21 and 22 are supported by the device. As illustrated, the comb 21, which is adjacent the rear and is disposed transversely of the path of movement of the device, is mounted in a grooved depending flange 23 and is removably retained in place by retaining screws 24. The comb 22 is supported at the forward portion of the device transversely of the outlet end 13 of the nozzle in the grooves 25, the comb being removably retained in place by retaining screws 26. In order to provide means for manipulating the device, a handle 27 is employed which is preferably in the nature of an arcuate bar attached at one end to the nozzle 12 and at the opposite end to the motor housing 9, although it is to be understood that the position of the handle may be varied if desired. Contacts 28 are suitably arranged to project from the device for establishing a connection with an extension cord for supplying current to the heating element and to the electric motor 8.

In use and operation, the pelt or fur A with the hair side B disposed upwardlly is laid or stretched on a suitable table or other supporting surface after the same has been dampened with water or other fluid employed for the treatment of the fur. The proper sized combs 21 and 22 are associated with the device and a vertical adjustment of the legs 14 and lateral adjustment of the arms 16 is effected in accordance with the character and size of the fur to be treated. The device is then moved over the fur or pelt in the direction indicated by the arrow in Figure 2, it being understood that an electrical connection is established for driving the motor and energizing the heating element 20. As the device is moved over the fur, it is obvious that air will be drawn into the draft chamber 6 through the inlet 7 due to the rapid rotation of the impeller blades 11, and the air is forced from the draft chamber through the nozzle 12 where its contact with the heating element 20 will heat the same to the desired temperature for expulsion through the downwardly directed outlet 13 against the hair side of the pelt or fur. During the movement of the device, the comb 22 will initially comb and raise the hair while the hot air draft is forcibly projected downwardly against the same to cleanse, dry and effect the glazing of the same while obviously the combs 21 and 22 operate to effect the desired combing action. Due to the fact that no heated element directly contacts with the hair, it is apparent that singeing or injury thereto from excessive heat will be positively precluded. In practice, the device may be run over the fur several times to accomplish the desired end if necessary. Due to the vertical adjustability of the legs 14, it is apparent that the device is adapted to operate upon furs of different characters, and the interchangeability of the combs also functions for this purpose. Due to the lateral adjustability of the arms 16 which carry the legs 14, the lower ends of the legs may be laterally adjusted to rest upon the table or supporting device.

From the foregoing, it will, therefore, be seen that an improved device for the treatment of furs has been devised, by virtue of which the glazing, cleansing, combing and drying of furs or pelts may be accomplished in a single operation while injury to the fur by singeing is entirely eliminated.

I claim:

1. In a device for the treatment of furs or pelts adapted for movement over the fur or pelt, a casing defining a draft chamber having an inlet and formed with a downwardly directed outlet nozzle, a rotary impeller within the draft chamber for drawing air into the inlet and expelling the same from the outlet nozzle, and means within said nozzle for heating the air during its passage therethrough.

2. In a device for the treatment of furs or pelts adapted for movement over the fur or pelt, a casing defining a draft chamber having an inlet and formed with a downwardly directed outlet nozzle, a rotary impeller within the draft chamber for drawing air into the inlet and expelling the same from the outlet nozzle, and means for supporting the casing for movement over the fur or pelt.

3. In a device for the treatment of furs or pelts adapted for movement over the fur or pelt, a casing defining a draft chamber having an inlet and formed with a downwardly directed outlet nozzle, a rotary impeller within the draft chamber for drawing air into the inlet and expelling the same from the outlet nozzle, and means for supporting the casing for movement over the fur or pelt consisting of laterally and vertically adjustable supporting legs.

4. In a device for the treatment of furs or pelts, a casing adapted for movement over the same, said casing defining a draft chamber having a downwardly directed nozzle and formed with an air inlet, a rotary impeller within the draft chamber for drawing air into the inlet and expelling the same from the outlet nozzle, means within said nozzle for heating the air during its passage therethrough, and means for supporting a comb transversely of and depending from the outlet nozzle for combing the hair during the expulsion of the heated air from the nozzle.

5. In a device for the treatment of furs or pelts, a casing adapted for movement over the same, said casing defining a draft chamber having a downwardly directed nozzle and formed with an air inlet, a rotary impeller within the draft chamber for drawing air into the inlet and expelling the same from the outlet nozzle, means within said nozzle for heating the air during its passage therethrough, means for supporting a comb transversely of and depending from the outlet nozzle for combing the hair during the expulsion of the heated air from the nozzle, and means for adjustably supporting the casing for movement over the fur or pelt.

6. In a device for glazing furs, said device adapted for movement thereover, and means for heating and forcibly projecting a draft of air against the fur.

Signed at New York, in the county of New York and State of New York this 19 day of July, 1929.

BENJAMIN FURGANG.